United States Patent
Noetzel et al.

(10) Patent No.: US 7,323,264 B2
(45) Date of Patent: Jan. 29, 2008

(54) FUEL CELL SYSTEM HAVING INTEGRATED CENTRAL CONTROL FUNCTION

(75) Inventors: John G. Noetzel, Brighton, MI (US); Kaushik Rajashekara, Carmel, IN (US); Harry L. Husted, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 606 days.

(21) Appl. No.: 10/855,601

(22) Filed: May 27, 2004

(65) Prior Publication Data

US 2005/0266282 A1    Dec. 1, 2005

(51) Int. Cl.
*H01M 8/04* (2006.01)
(52) U.S. Cl. .................. 429/22; 429/23; 429/34; 429/19; 180/65.3

(58) Field of Classification Search .............. 429/22, 429/23, 24, 25, 30, 19, 20, 21; 180/65.3
See application file for complete search history.

(56) References Cited

U.S. PATENT DOCUMENTS

| | | | |
|---|---|---|---|
| 2002/0182463 A1* | 12/2002 | Jones et al. | 429/23 |
| 2003/0194587 A1* | 10/2003 | Fagley | 429/17 |
| 2005/0084724 A1* | 4/2005 | Rainville et al. | 429/23 |
| 2005/0255343 A1* | 11/2005 | Keskula et al. | 429/12 |

* cited by examiner

*Primary Examiner*—Raymond Alejandro
(74) *Attorney, Agent, or Firm*—Paul L. Marshall

(57) ABSTRACT

A fuel cell system in accordance with the invention includes a single, central electronic controller (CPU) for controlling at least the Air Handling sub-system, the Reformer sub-system, the Power Electronics sub-system, and the Customer Interface sub-system. The central controller provides a central location for easier serviceability; increases data transport efficiency by eliminating lengthy links between distributed controllers; eliminates the need for multiple mechanical enclosures; allows for controller thermo conditioning in one mechanical enclosure; and reduces parasitic power losses by employing a single power supply.

9 Claims, 2 Drawing Sheets

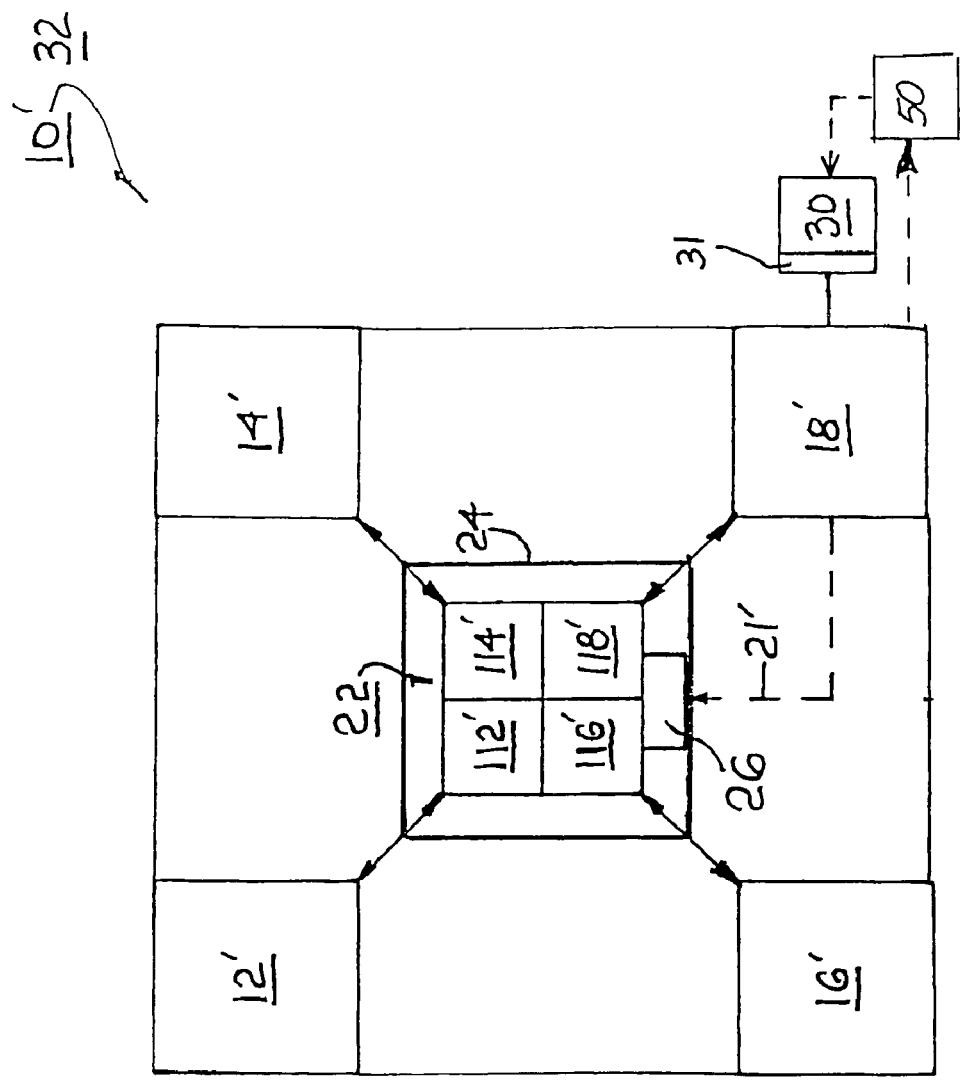

FUEL CELL SYSTEM HAVING INTEGRATED CENTRAL CONTROL FUNCTION

TECHNICAL FIELD

The present invention relates to fuel cell systems for generating electric power; more particularly, to fuel cell systems having electronic control of sub-systems; and most particularly, to a fuel cell system having an integrated central controller for controlling said fuel cell sub-systems.

BACKGROUND OF THE INVENTION

Fuel cells for combining hydrogen and oxygen to produce electricity are well known. A known class of fuel cells includes a solid oxide electrolyte layer through which oxygen anions migrate; such fuel cells are referred to in the art as "solid-oxide" fuel cells (SOFCs). Another known class of fuel cells includes a membrane through which protons migrate; such fuel cells are referred to in the art as "proton exchange membrane" fuel cells (PEMFCs). Other known classes of fuel cells may comprise phosphoric acid, solid polymer, molten carbonate, alkaline, direct methanol, regenerative, zinc air, and protonic ceramic. The present invention should be understood to comprehend all classes of fuel cells including, for example solid oxide fuel cell, proton exchange membrane, phosphoric acid, solid polymer, molten carbonate, alkaline, direct methanol, regenerative, zinc air and protonic ceramic fuel cells. However, for simplicity, the discussion below is specific to SOFCs.

In some applications, for example, as an auxiliary power unit (APU) for an automotive vehicle, an SOFC stack assembly is preferably fueled by "reformate" gas, which is the effluent from a catalytic gasoline oxidizing reformer. Reformate typically includes amounts of carbon monoxide (CO) as fuel in addition to molecular hydrogen.

The reforming operation and the fuel cell operation may be considered as first and second oxidative steps of the liquid hydrocarbon, resulting ultimately in water and carbon dioxide. Both reactions are exothermic, and both are preferably carried out at relatively high temperatures, for example, in the range of 650° C. to 900° C.

A fuel cell system may be considered to be a chemical engine comprising a plurality of components, sub-assemblies, and sub-systems joined together mechanically and electrically to provide the desired flow paths and control pathways for the fuel, combustion air, reformate, spent gases, cooling gases, and electric current. Typically, there are at least four basic sub-systems: Air Handling, which includes reformer air, cathode air, and cooling air; Reformer, which includes fuel handling and thermal management; Power Electronics, which includes output power conditioning; and Customer Interface. In individual applications, additional sub-systems may be required and/or functional assignments may be grouped differently.

Electronic control is required to manage the various sub-systems to effect the energy conversion process. In the prior art, the sub-systems typically are managed by a distributed control system wherein each sub-system is controlled by a separate micro-controller programmed with algorithms specific to that sub-system. The various micro-controllers are linked by a common communication link for sharing data. This architecture can be useful during development phases of the various sub-systems of an SOFC, facilitating independent development of each sub-system. However, in a fully-developed fuel cell system, this architecture has several drawbacks.

First, parasitic energy losses can be relatively large, as each micro-controller requires a separate regulated power supply between the voltage generated by the fuel cell system and the voltage required for the micro-controller.

Second, a distributed control system may require separate diagnostic and development tools for each sub-system.

Third, a distributed control system may require separate thermo and electrical interfaces for each micro-controller.

Fourth, a distributed control system requires separate paths or bus links between micro-controllers. A typical serial data link can introduce latency delays of up to 100 msec, depending upon the volume of bus traffic.

Fifth, a distributed control system typically requires separate mechanical packages and separate DC power regulator integrated circuits for each micro-controller, and the various controllers must adapt to various ambient thermal and electrical conditions. The various packages may be in different physical locations, making joint servicing or maintenance difficult.

What is needed in the fuel cell system art is a means for integrating the control functions.

SUMMARY OF THE INVENTION

Briefly described, a fuel cell system in accordance with the invention includes a single, central electronic controller for controlling at least a multiple of the Air Handling sub-system, the Reformer sub-system, the Power Electronics sub-system, and the Customer Interface sub-system. The central controller:

a) provides a central location for easier serviceability;

development and service tools of a distributed system are reduced by as much as 75%;

b) increases data transport efficiency by eliminating lengthy links between distributed controllers; data is instead transferred to the subsystem control algorithms via the central random access memory (RAM) in the centralized controller;

c) eliminates the need for multiple mechanical packages; can reduce the size and number of separate enclosures by as much as 75%;

d) allows for controller thermo conditioning in one mechanical package; can reduce redundant energy losses by as much as 75%; and e) reduces parasitic power losses by employing a single power supply rather than the redundant power supplies in a distributed control system; typical single power source is 90% efficient, whereas four separate power sources are about 66% net efficient.

BRIEF DESCRIPTION OF THE DRAWINGS

The present invention will now be described, by way of example, with reference to the accompanying drawings, in which:

FIG. 2 is a schematic drawing of the fuel cell system shown in FIG. 1 but including a central controller, in accordance with the invention.

DESCRIPTION OF THE PREFERRED EMBODIMENTS

Figure 1:
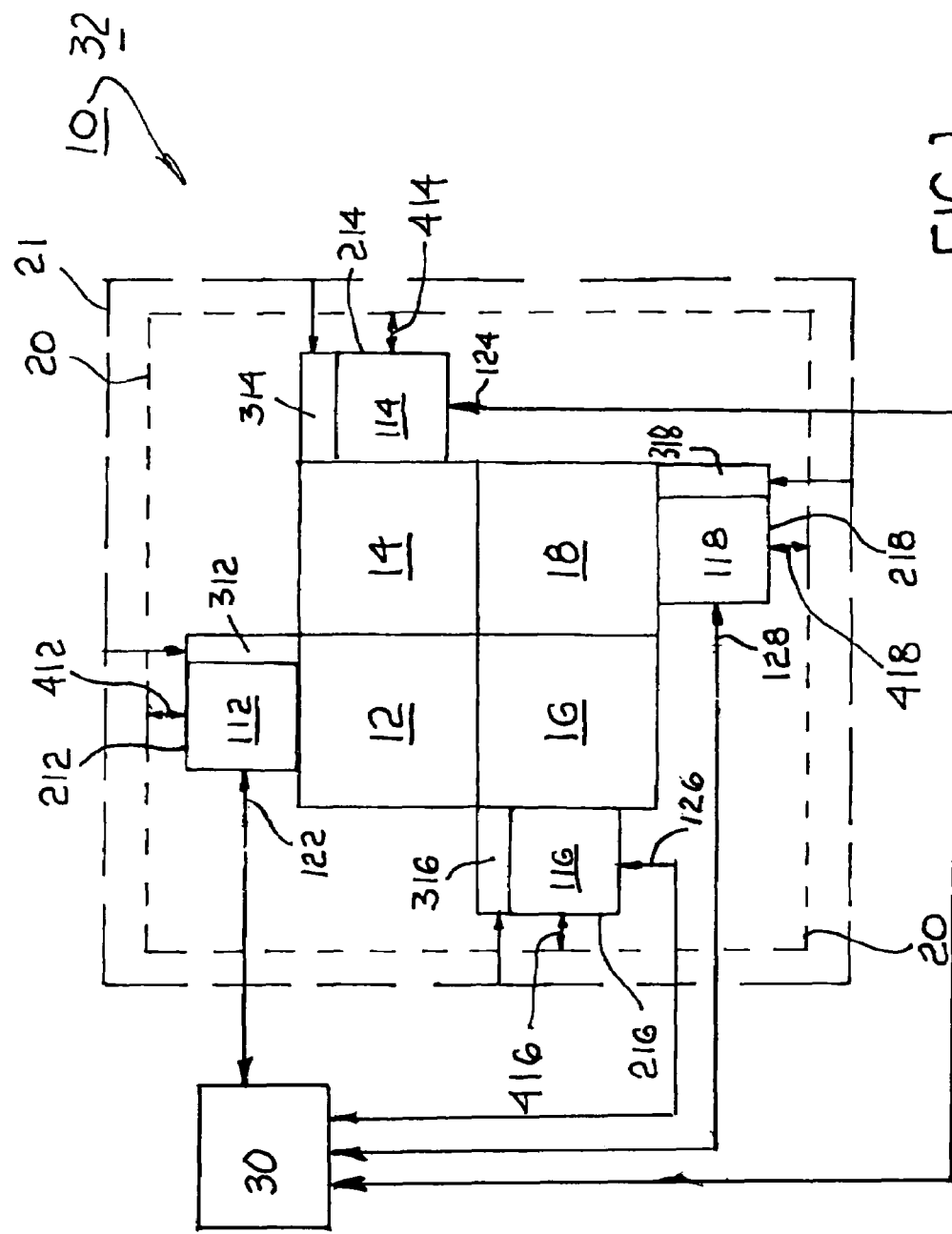
FIG. 1 is a schematic drawing of a prior art fuel cell system, including a distributed control system, in accordance with the prior art.

Referring to FIG. 1, an exemplary prior art SOFC system 10 having distributed control includes an Air Handling sub-system 12, a Reformer sub-system 14, a Power Electronics sub-system 16, and a Customer Interface sub-system 18 connected to a power consumer, such as a vehicle, power grid, or residence, 30. (Other sub-systems are possible for some applications and/or the functions may be grouped differently, within the scope of the invention. Also, the SOFC discussed herein is only representative and exemplary of all classes of fuel cells comprehended by the invention.)

Each sub-system 12,14,16,18 is individually controlled by a micro-processor 112,114,116,118, respectively, which are connected to sensors and actuators (not shown), for sensing, for example, temperature, pressure, voltage, current, air flow and fuel flow within the sub-systems. The micro-processors are connected via serial data links and/or signal wires 122,124,126,128, respectively, to power consumer 30. Each micro-processor is disposed in its own environmentally-controlled enclosure 212,214,216,218, respectively. The micro-processors are powered by individual regulated power supplies 312,314,316,318 and are in one- or two-way data communication via links 412,414,416,418 to an external serial bus 20. The power supplies are also parasitic output power consumers, being connected by supply loop 21 to the output of the fuel cell system. System 10 is suitable for use, for example, as an Auxiliary Power Unit (APU) 32 in a power consumer 30, which may be stationary or mobile, for example, a power grid or residence, or a vehicle.

Referring to FIG. 2, a fuel cell system 10' in accordance with the invention, having a central electronic controller 22, includes an Air Handling sub-system 12', a Reformer sub-system 14', a Power Electronics sub-system 16', and a Customer Interface sub-system 18' connected to power consumer 30. Fuel cell system 10' is also suitable for use, for example, as an Auxiliary Power Unit (APU) 32 in a power consumer 30, which may be stationary or mobile, for example, a power grid or a vehicle.

Central electronic controller 22, having a single regulated power supply 26, is disposed within a single environmentally-controlled enclosure 24, and is connected by power lead 21' to a source of electrical power, such as, for example, vehicle battery power 31 passing from power consumer 30 through sub-system 18'. Central electronic controller 22 assumes the control functions of micro-processors 112, 114, 116, 118 in the prior art, including but not limited to algorithm executive, power moding, reformer control, process air control, fuel cell control, APU maximum power point operation, output voltage regulation, and overall system diagnostics. These control functions are schematically indicated by regions 112', 114', 116', 118' within central electronic controller 22, and the prior art links 412, 414, 416, 418 therebetween are eliminated. Prior art bus 20 is also eliminated through the use of shared microcontroller memory. Latency delays of up to 100 msec between microprocessors in prior art system 10 are greatly reduced to the time needed to write and read internal RAM in the central microcontroller, on the order of microseconds. In addition, central electronic controller 22 is provided with a single set of diagnostic, maintenance, and process algorithms for all the sub-systems. Central electronic controller 22 must have ample memory and interface circuitry to control the chemical process during all modes of operation of fuel cell system 10'.

A fuel cell system in accordance with the invention may further comprise an application interface module 50 which provides an integration path to various external applications. For example, in the system depicted in FIG. 2, exemplary interface module 50 provides a gateway function from the APU system and the consumer application sub-system. Gateway functions may include impedance matching, serial data, EMI/EMC, and electromechanical interface integration.

Power to run the central controller and actuators may be electrochemically produced via the fuel cell stacks, or taken from the power consumer 30 having its own storage device, such as for example, a battery 31, or its own electrical power bus.

A fuel cell system having a central controller in accordance with the invention thus:
provides a central location for electronic control;
uses a single controller for controlling the fuel cell stack, reformer, and balance of plant;
increases data transport efficiency and reduces latency;
eliminates the need for multiple controller housings;
allows for environmental conditioning within a single enclosure; and
reduces parasitic power losses.

A fuel cell system in accordance with the invention may be provided with a distributed control system comprising a plurality of individual micro-processors during development stages of the fuel cell system, and then converted by up-integration of the distributed system into a central control system for manufacturing and customer use.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A fuel cell system comprising;
a) a plurality of controllable sub-systems including an air handling sub-system, a reformer sub-system, a customer interface sub-system, and a power electronics sub-system;
b) a central electronic controller for controlling said plurality of sub-systems of said fuel cell system; and
c) an application interface module providing a gateway function from said fuel cell system and said customer interface sub-system, wherein said gateway function includes impedance matching, serial data, EMI/EMC, and electromechanical interface integration.

2. A fuel cell system in accordance with claim 1 wherein said fuel cell is selected from the group of fuel cells consisting of solid oxide, proton exchange membrane, phosphoric acid, solid polymer, molten carbonate, alkaline, direct methanol, regenerative, zinc air, and protonic ceramic.

3. A fuel cell system in accordance with claim 1 wherein said fuel cell system is an auxiliary power unit.

4. A fuel cell system in accordance with claim 3 wherein said auxiliary power unit is disposed in a vehicle for supplying output power thereto.

5. A fuel cell system in accordance with claim 3 wherein said auxiliary power unit is a component of a power grid.

6. A fuel cell system in accordance with claim 3 wherein said auxiliary power unit is a component of a residential electrical system.

7. A fuel cell system in accordance with claim 1 wherein said controllable sub-systems include sensors, actuators, and interconnect and control strategy.

8. A vehicle comprising a fuel cell system including:
a plurality of controllable sub-systems including an air handling sub-system, a reformer sub-system, a customer interface sub-system, and a power electronics sub-system;
a central electronic controller for controlling said plurality of sub-systems of said fuel cell system; and
c) an application interface module providing a gateway function from said fuel cell system and said customer interface sub-system, wherein said gateway function includes impedance matching, serial data, EMI/EMC, and electromechanical interface integration.

9. A vehicle in accordance with claim 8 wherein said controllable sub-systems include sensors, actuators, and interconnect and control strategy.

* * * * *